July 1, 1930. J. T. RYDBERG 1,769,393
AEROPLANE
Filed Dec. 7, 1927 5 Sheets-Sheet 1
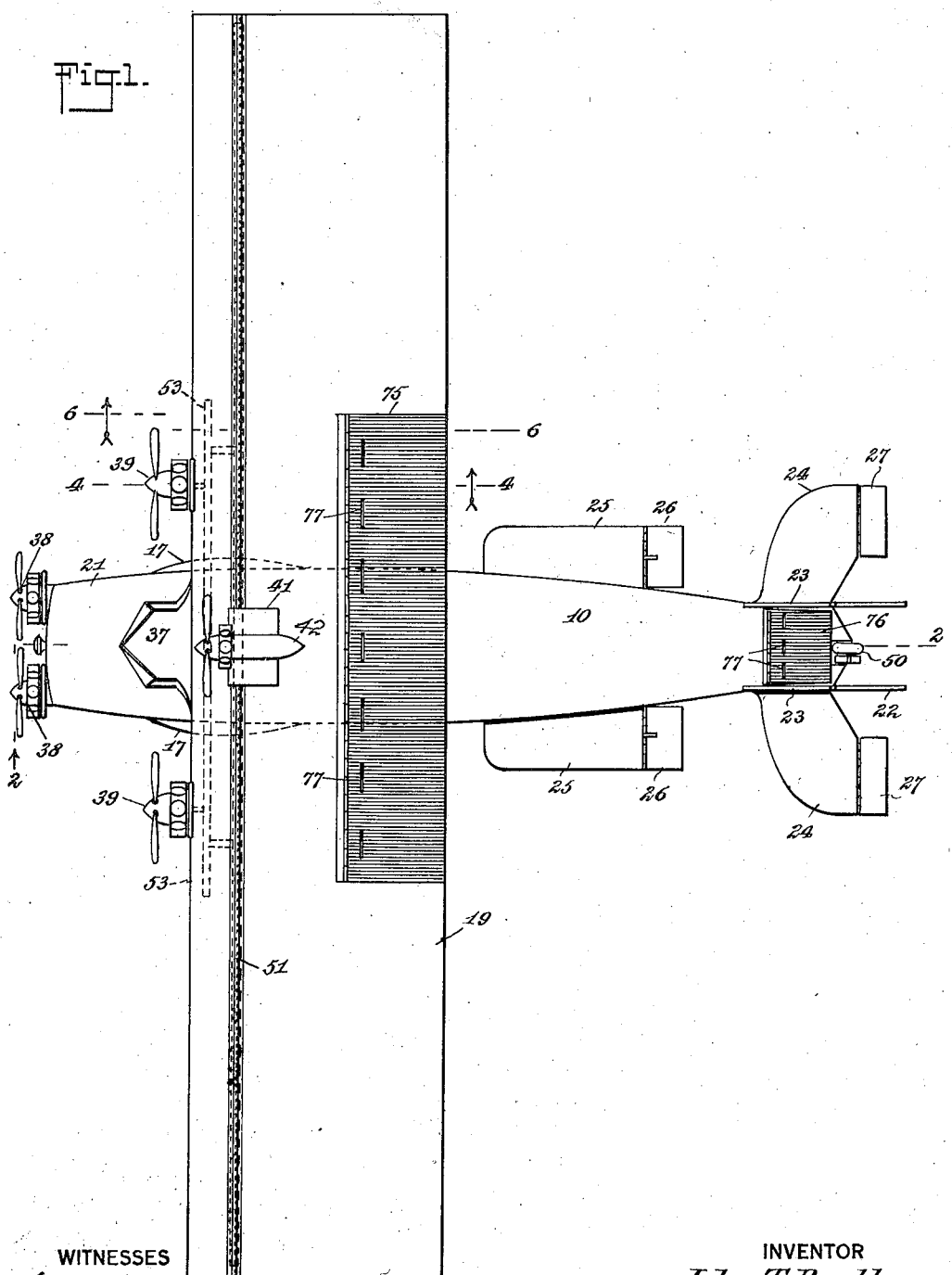
WITNESSES
INVENTOR
John T. Rydberg
BY
ATTORNEY

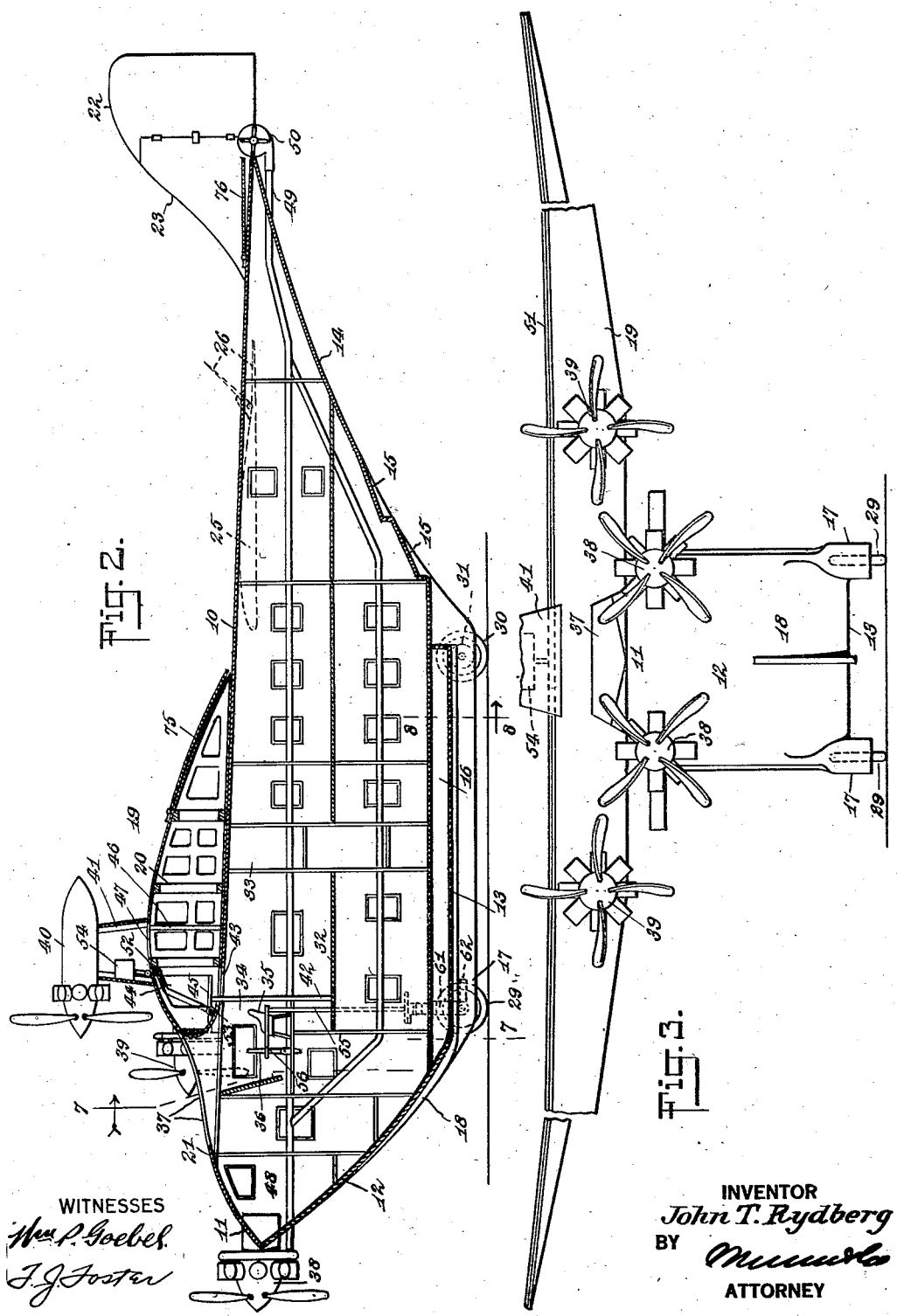

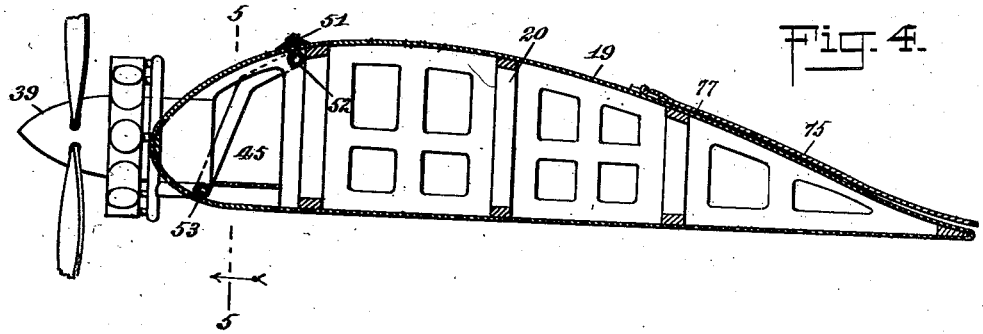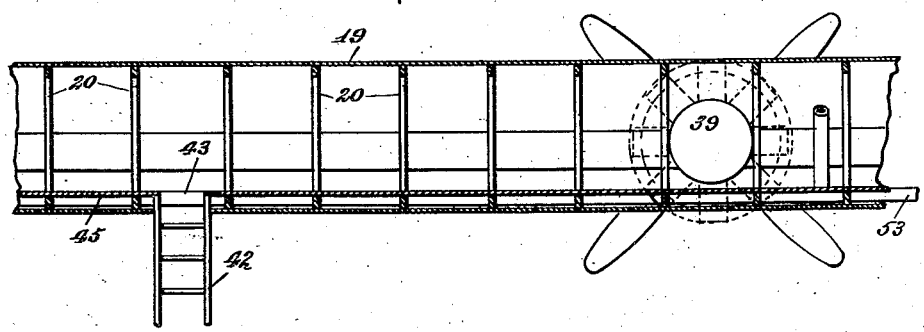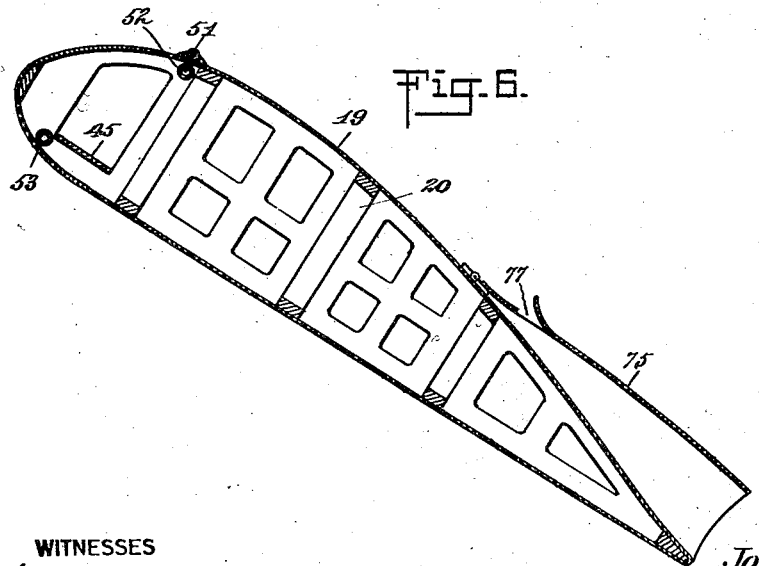

July 1, 1930. J. T. RYDBERG 1,769,393
AEROPLANE
Filed Dec. 7, 1927 5 Sheets-Sheet 4

WITNESSES
William P. Goebel.
Franklin J. Foster

INVENTOR
John T. Rydberg
BY
ATTORNEY

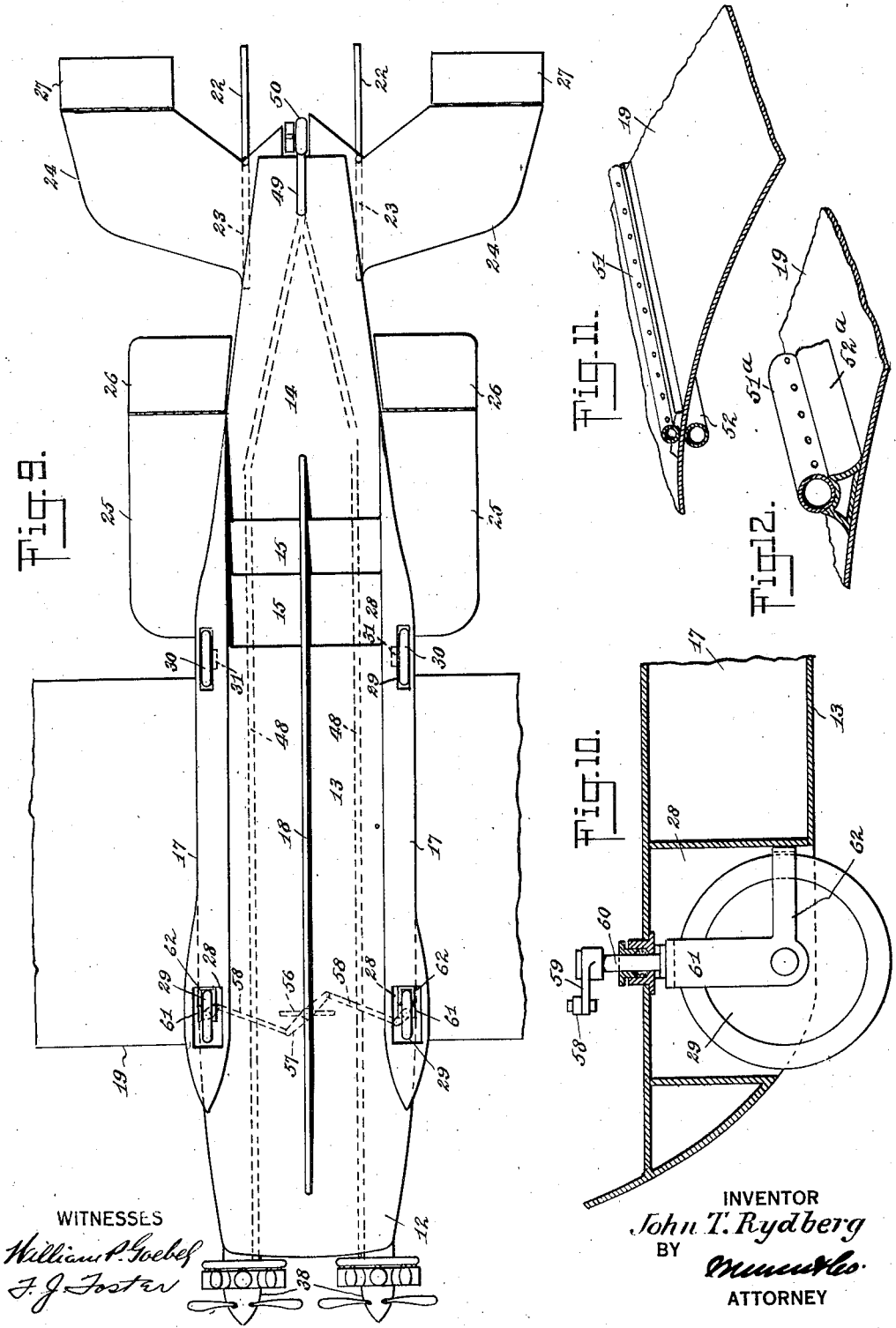

Patented July 1, 1930

1,769,393

UNITED STATES PATENT OFFICE

JOHN T. RYDBERG, OF HARRISON, NEW JERSEY

AEROPLANE

Application filed December 7, 1927. Serial No. 238,369.

The aeroplane of the present invention is of the amphibian type, an object of the invention being to provide a plane equipped with a novel type of landing gear which well adapts it for landing either on water or on the ground.

Another object of the invention is to provide an aeroplane embodying unique stabilizing features which are of material advantage when travelling through water preparatory to taking off and when taking off from water.

Another object of the invention is to provide an aeroplane well equipped to meet all types of weather conditions, particularly a plane which is adapted to be highly efficient when flying in sleet and snow, in that novel means is provided for preventing the sleet and snow from collecting upon the wings of the plane and destroying the proper balance of the plane.

Other features of the invention are the provision of a unique method of utilizing the engine exhaust gases for heating the body of the plane and for assisting in preventing the formation of ice, or of the depositing of snow upon the plane wings.

Another object of the invention is to provide an aeroplane equipped with unique mechanism for automatically restoring the plane to normal position in the event that it goes into a tail spin.

Other objects are to provide a plane embodying a plurality of prime movers some of which are located on the wings, and to so construct the wings of the plane that such prime movers are readily accessible for purposes of attendance and repair.

Other and further objects of the invention are to provide an aeroplane of extremely simple and practical construction which will be rugged, durable and efficient in use, and well suited to the requirements of economical manufacture and convenient manipulation.

More specifically, the invention contemplates the provision of a relatively gigantic amphibian air liner in which the body simulates to a large extent the body of a bird, and the wings simulate in so far as is practical the general shape of a bird's wings. A body thus constructed affords the desirable stream line effect, and by the provision of suitable keel mechanism is unusually easy to handle when landing or taking off, particularly when landing on, or rising from the water.

The body and wings as noted above utilize the engine exhaust for heating purposes. The wings are so constructed that they need no supplemental bracing or strut means to connect them to the body, being self sustaining against lateral stresses. They are sufficiently capacious to serve as storage spaces, and sufficiently rugged to stand up under the unusual excess loads imposed upon them.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a top plan view of an aeroplane embodying the invention.

Fig. 2 is a longitudinal sectional view therethrough on the line 2—2 of Fig. 1.

Fig. 3 is a fragmentary broken front elevational view thereof.

Fig. 4 is a transverse sectional view through the wing taken approximately on the line 4—4 of Fig. 1.

Fig. 5 is a fragmentary longitudinal sectional view on the line 5—5 of Fig. 4.

Fig. 6 is a transverse sectional view on the line 6—6 of Fig. 1 showing the manner in which the air pocket functions to retard a tail spin.

Fig. 9 is a bottom plan view of the aeroplane.

Fig. 10 is an enlarged longitudinal sectional detail taken on the line 10—10 of Fig. 7.

Fig. 11 is a fragmentary perspective detail showing the oil distributing and heating pipes embodied in the wing structure.

Fig. 12 is a similar view illustrating a slight modification.

Figures 7, 8:
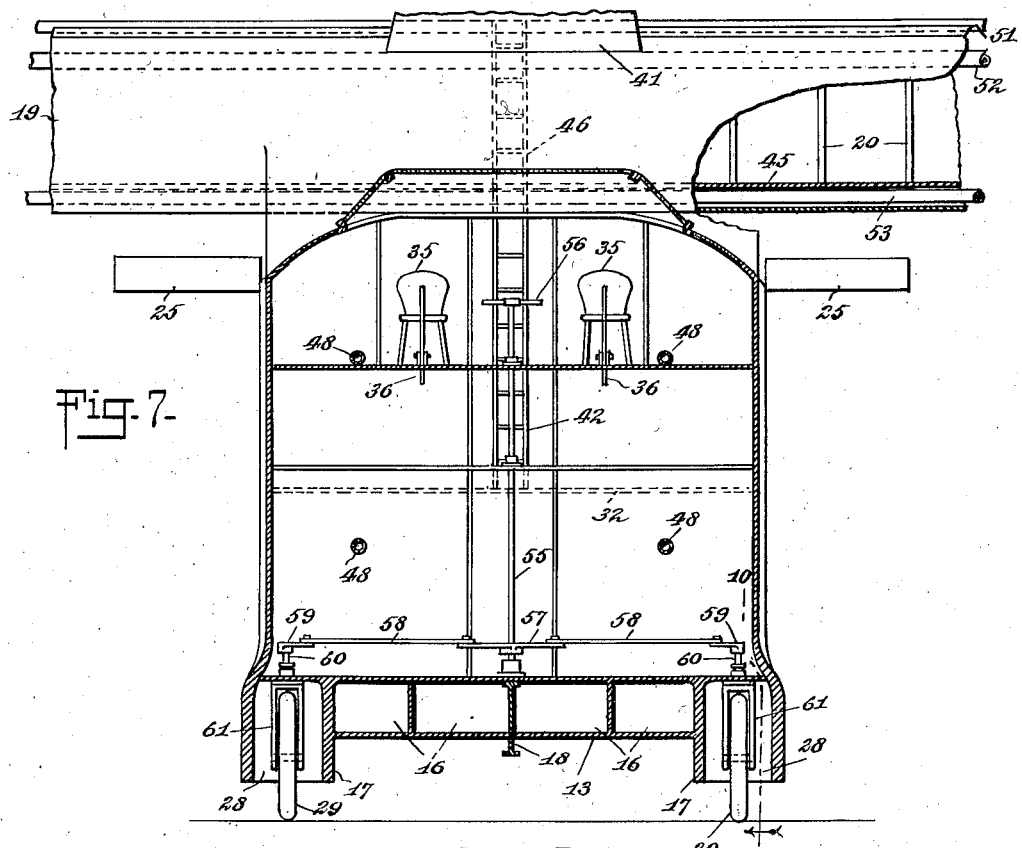
Fig. 7 is a fragmentary transverse sectional view through the body of the plane taken approximately on the staggered line 7—7 of Fig. 2.
Fig. 8 is a transverse sectional detail on the line 8—8 of Fig. 2.

The general shape of the body may be best seen from Figs. 1, 2 and 3. As suggested above the body follows in a general way the shape of a bird's body, but for practical purposes, this shape has been more or less conventionalized. The body is of general elongated formation preferably rectangular in cross section with a substantially straight flat or rounded top 10 and with a pointed nose 11 disposed well above the major longitudinal axis of the body. From the nose 11 the breast 12 of the body slopes rearwardly to a relatively short substantially flat bottom 13. The tail 14 on its upper surface is a continuation of the flat body top, and on its lower surface inclines gradually upwardly from the rear end of the relatively short flat bottom 13. This lower inclined surface of the tail 14 is formed with a plurality of inclined steps 15 adjacent the forward end of the tail for a purpose which will be more fully hereinafter discussed.

The body is of course hollow, and preferably inherently buoyant, although I have shown the use of supplemental buoying means in the nature of watertight air compartments 16 running longitudinally of the body at the bottom thereof. Additional buoyancy is lent by the hollow longitudinally extending keels 17 depending from the bottom of the body at each side edge. For stabilizing purposes the keels 17 are supplemented by a solid counter-balancing keel 18 centrally arranged. Both the hollow keels 17 and the central keel 18 are extended rearwardly at least as far as the uppermost of the steps 15. When the aeroplane is taking off from the water, and its nose is pointed upwardly, the various steps 15 with their associated stabilizing keels, will effectively maintain the body against rolling and materially assist in the take-off. The step formation also serves somewhat in the manner of an aquaplane to assist in elevating the body when the latter starts to lift under its own power.

The device is preferably of the monoplane type including a single relatively large wing 19 secured to the top of the body adjacent the forward end of the latter. This wing due to the interior bracing indicated at 20 is self sustaining against lateral stresses, and no supplemental bracing means or guy means need be employed between wing and body.

Carrying out the general stream line effect of the body, the top of the plane from the nose 11 inclines upwardly in a gradual slope at 21, and merges with the convexly curved upper surface of the wing 19.

The wings are preferably substantially flat bottomed and convex topped as seen in the sectional Fig. 4, and are of gradually decreasing thickness toward their tips as seen in Fig. 3. This decrease in thickness is accentuated by rather sharply inclining the under surfaces of the wings upwardly toward the tips, thereby producing in a conventionalized form the general shape of a bird's wings.

Instead of using a single rudder as is customary, I mount a pair of cooperating rudders 22, one at each side of the tail of the plane, these rudders being hung on the usual fins 23 and controlled in a conventional manner (not illustrated). The usual laterally projecting stabilizers 24 are also employed at the tail of the plane.

An auxiliary lifting surface and balancing means is utilized in the nature of a pair of supplemental wings or stabilizers 25 projecting laterally from the top of the body rearwardly of the main wing 19. These stabilizers are provided on their rear ends with elevators 26 adapted to automatically function in righting the plane from a tail spin and serving to supplement the usual elevators 27 on the stabilizer 24.

Downwardly facing pockets 28 arranged near the forward and rear ends of the hollow keels 17 serve as housings for forward traction wheels 29 and rear traction wheels 30. The forward traction wheels are equipped with steering mechanism which will be later described, and the rear traction wheels are equipped with brake mechanism which may be entirely conventional, and which has been indicated only as a brake drum 31 in dotted lines in Fig. 2.

The body of the plane is longitudinally and transversely divided by any suitable number of decks 32 and bulkheads 33 into a series of cabins or compartments. The manner of internal subdivision of the plane body is subject to such a wide range of variation that it need not be discussed in detail here. The control cabin indicated at 34 is arranged in the forward upper portion of the body in such a manner that pilots seated in their chairs 35 within convenient reach of the usual control stick 36 may look through a window 37 arranged in the upwardly sloping portion 21 of the body.

I do not wish to restrict myself to any special arrangement of prime movers, but have illustrated one practical arrangement in which four motors and associated propellers are used. Two motors 38 are mounted on the forward end of the body substantially at the nose of the plane. Two other propellers and engines 39 are mounted on the wing, one at each side of the body, while the fifth prime mover 40 is suitably supported on an enclosed housing 41 rising from the center of the wing.

The motors 38 are readily accessible through the body of the plane. With a view to gaining access to the motors 39, a ladder 42 leads from the pilot's cabin through a hatchway 43 into the wing. This hatchway gives access to a longitudinally extending compartment 44 in the front of the wing, equipped with a gangway 45 along which a mechanic may pass to either of the engines 39. From the gangway 45, he may also reach a ladder 46 leading upwardly through a hatchway 47 into the housing 41 immediately beneath the engine 40.

The exhaust from the engines 38 may be passed through any suitable number of heating pipes 48 having as many branches or by-passes as necessary before passing out at 49 through the tail of the plane. The circulation of exhaust gases through the pipes 48 may be assisted by one or more fans 50, whereby the efficiency of the engines will not be retarded due to the backing up of exhaust gases.

Means is provided for preventing the collection or freezing of moisture on the upper wing surface. This means consists of an apertured oil pipe 51 disposed on top of the wing and extending longitudinally thereof at a point somewhat forwardly and below the highest point of the wing. Concealed within the wing and immediately beneath the oil pipe 51 is an exhaust pipe 52 discharging through the ends of the wing and connected to an exhaust header 53 from the engines 39.

In Fig. 12 I have illustrated a slight modification in which a steam pipe 52$^a$ mounted on the top surface of the wing serves to cradle and support an oil distributing pipe 51$^a$. Obviously, the device of Figs. 11 or 12 might be mounted at the leading edge of the wing if desired.

In inclement weather, oil is introduced into the pipe 51 from any suitable source, preferably flowing gravitationally from a tank 54 in the chamber 41. This oil, heated by the exhaust pipe 52 escapes through the apertures in the pipe 51, some of it flowing gravitationally over the front of the wing, and most of it being blown back over the rear surface of the wing, thereby keeping the wing top both heated and oiled to insure against any deposit of snow or any freezing of moisture on the wing surface. Additional exhaust fans (not shown) may of course be employed in connection with the pipe 52 if desired.

The steering mechanism for the front traction wheels 29 includes a vertical rod 55 rotatable by a handle lever 56 in the control cabin. The rod 55 at its lower end carries crank arms 57, the ends of which are pivotally connected by links 58 to cranks 59 rigid with vertical shafts 60 carrying yokes 61 in which the traction wheels 29 are journalled. Preferably, the yokes 61 as best seen in Fig. 10 include rearwardly projecting extensions 62 straddling the wheels and abutting the rear walls of the chambers 28 to restrain the yokes against twisting and the wheels against undue freedom of movement when the plane is landed on the ground. For the sake of clarity of illustration I have omitted the showing of shock absorbing means of any conventional character in connection with both the forward and rear traction wheels.

As suggested above the elevators 26 may be either manually or automatically controlled to check back slipping or tail spinning of the plane. The elevators are assisted in this function automatically by the provision of a flexible pocket forming member 75 secured at its forward and side edges to the top of the wing and having a free rear edge. A similar pocket forming member 76 is employed on the tail of the plane between the rudders. Any tendency of the plane to back-slip or tail-spin causes air to rush into these pockets and automatically check such slip or spin and restore the plane to substantially normal flying position as will be readily understood. In order to prevent the pockets 75 and 76 from being torn off by the sudden inrush of air, the relatively restricted air vents 77 are employed near the forward edges of the pockets. In Fig. 6 I have shown the forward pockets 75 functioning when the plane is sloping rearwardly at a dangerous angle.

From the foregoing description it will be apparent that the device is well adapted for both land and marine purposes. Most of the conventional control mechanism has been avoided in order that the drawings may not be unduly complicated.

Obviously, various changes and alterations might be made in the general form and arrangement of the parts described without departing from the invention. Hence I do not wish to limit myself to the details set forth, but shall consider myself at liberty to make such changes and alterations as fairly fall within the spirit and scope of the appended claims.

I claim:

1. An aeroplane including an elongated closed hollow body and hollow wings, the body including sides, a top and a shorter bottom, and an upwardly inclining section extending rearwardly from the rear of the bottom and cooperating with the sides and top to form a tail, said inclined under surface of the tail including a series of inclined step portions, and keels on each side of said step portions.

2. An aeroplane including an elongated closed hollow body and hollow wings, the body including sides, a top and a shorter bottom, and an upwardly inclining section extending rearwardly from the rear of the bottom and cooperating with the sides and top to form a tail, and hollow buoyant keels depending from opposite sides of the bottom, and extending up the inclined section.

3. An aeroplane including an elongated closed hollow body and hollow wings, the body including sides and a shorter bottom, and an upwardly inclining section extending rearwardly from the rear of the bottom and cooperating with the sides and top to form a tail, hollow buoyant keels depending from opposite sides of the bottom, and a central non-buoyant stabilizing keel extending longitudinally of the bottom in parallelism with said buoyant keels.

4. An aeroplane including an elongated closed hollow body and hollow wings, the body including sides, a straight and a shorter bottom, and an upwardly inclining section extending rearwardly from the rear of the bottom and cooperating with the sides and top to form a tail, hollow buoyant keels depending from opposite sides of the bottom, and a central non-buoyant stabilizing keel extending longitudinally of the bottom in parallelism with said buoyant keels, the inclined under surface of the tail defining successive inclined steps near the plane bottom and said keels being continued over the stepped portion.

5. An aeroplane including an elongated closed hollow body and hollow wings, the body including sides and a shorter bottom, and an upwardly inclining section extending rearwardly from the rear of the bottom and cooperating with the sides and top to form a tail, hollow buoyant keels depending from the opposite sides of the bottom, and a central non-buoyant stabilizing keel extending longitudinally of the bottom in parallelism with the buoyant keels, said inclined under surface of the tail including a series of inclined step portions, said keels having downwardly facing pockets near their ends accommodating pairs of front and rear traction wheels.

6. A device as set forth in claim 5 whereby in means is provided for steering the front wheels and braking the rear wheels.

Signed at New York in the county of New York and State of New York this 5th day of December A. D. 1927.

JOHN T. RYDBERG.